Jan. 27, 1942.    C. L. SAINTY    2,271,401
APPARATUS FOR FILTERING OR CLEANING AIR OR OTHER GASES
Filed Oct. 25, 1940    2 Sheets-Sheet 1

Christopher L. Sainty INVENTOR

BY

ATTORNEY

Jan. 27, 1942.    C. L. SAINTY    2,271,401
APPARATUS FOR FILTERING OR CLEANING AIR OR OTHER GASES
Filed Oct. 25, 1940    2 Sheets-Sheet 2
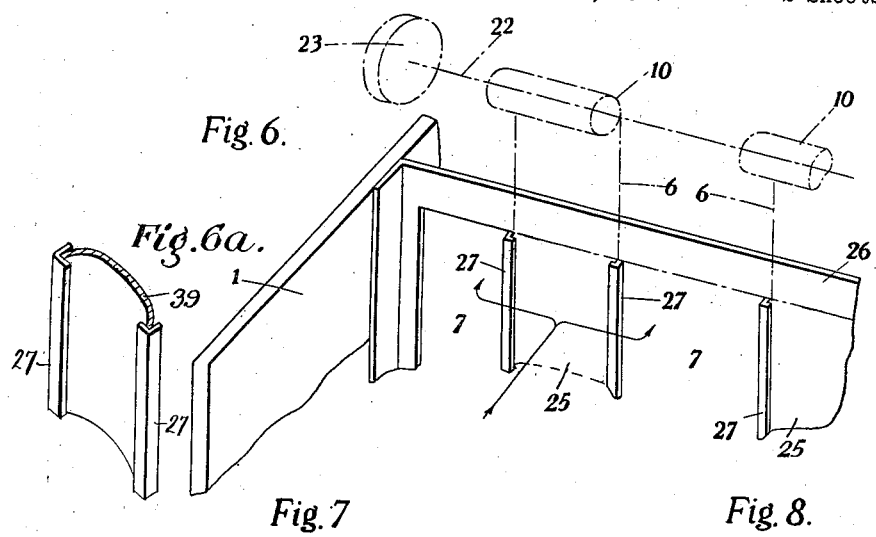
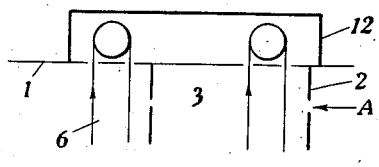
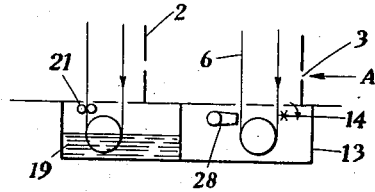
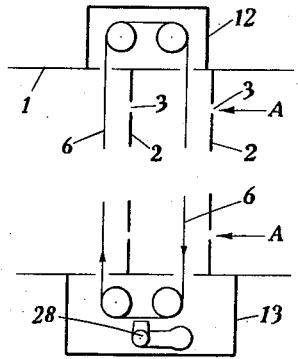
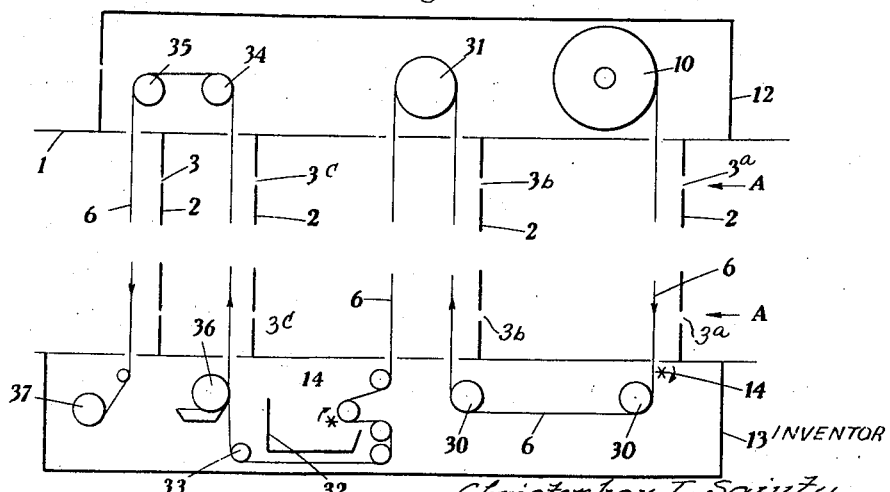
INVENTOR
Christopher L. Sainty
BY
ATTORNEY Patented Jan. 27, 1942

2,271,401

UNITED STATES PATENT OFFICE 2,271,401

APPARATUS FOR FILTERING OR CLEANING AIR OR OTHER GASES

Christopher Lawrence Sainty, London, England, assignor to Carrier Engineering Company Limited, London, England, a company of Great Britain Application October 25, 1940, Serial No. 362,855
In Great Britain January 7, 1939

5 Claims. (Cl. 183—75)

This invention relates to apparatus for filtering air or other gases to remove soot or dust particles and the like from the gas.

It has been proposed to filter air and other gases to remove soot and other particles therefrom by continually changing the direction of gas flow so that the particles are separated by impact on surfaces inclined to the general direction of flow. To this end rigid eliminator baffles providing the required impact surfaces are disposed in the duct conveying the particle laden gases.

A method of filtering air and other gases to remove soot and other particles therefrom is also known in which the air or other gas having the impurities in suspension is passed through cages containing metal wool or glass wool or pads made of fibrous and other material, and where the wool is employed it is usually provided with a surface obtained by dipping the wool in an adhesive so that the particles are collected on the wool.

When the air or gas passes through the coated wool, the adhesive eventually becomes laden with particles extracted from the air or other gas being filtered, and in order to extend the life of the filter it has been proposed to mount the cages containing the metal wool on a conveyor system so that the surface filtering the air is intermittently changed.

It will be noted that in both these constructions the air is forced through the filter, and that as the filter becomes clogged the resistance to the air or gas flow increases, and the main object of the present invention is to obtain a constant resistance to the gas stream being filtered, as well as to provide improved means whereby the efficiency of the filter is maintained.

A novel principle of construction is involved in the manufacture of filters in accordance with the invention consisting in providing jets to direct the gas to be filtered in relation to individual baffles arranged in laterally spaced relation in front of the jets so that the resistance in the system is substantially wholly composed of the resistance to air flow at the jets, and thereby a substantially constant resistance for the filter is obtained.

It may here be stated that it has already been proposed to dispose in an air duct a series of partitions, each of which comprised groups of perforations or nozzles, the groups in adjacent partitions being in staggered relation so that imperforate partition areas are disposed opposite each group in the general direction of air flow, and to form the imperforate area with a surface provided with a pile fabric to hold dust particles flung out of the impinging air stream, and no claim is herein made to the employment of a succession of partitions either perforated or slotted in staggered relation as just referred to.

Air or other gas filtering apparatus according to the invention comprises ducting partition means in said ducting for forming a plurality of separate and independent streams of gas arranged in spaced rows, a plurality of individual baffles, the number of baffles corresponding with the number of rows of gas streams, the baffles being arranged in spaced relation in a plane perpendicular to the direction of flow of the gas streams so that the local width is relatively small as compared with the cross sectional area of the ducting and being so located relatively to the gas streams that the gas streams impinge upon the baffles substantially medially thereof, each of said baffles comprising a filtering surface formed to retain particles extracted from the gas flow. The baffles impose a momentum change on the streams and a consequential distribution of the gas across the baffle surfaces which produces the desired filtering effect.

In one preferred construction according to the present invention, the apparatus for filtering air or other gas to remove soot or dust particles comprises a conduit having a transversely arranged apertured partition by which high speed streams are formed and baffles spaced therefrom in the general direction of gas flow characterised in that the apertures are arranged in spaced columns or rows (hereafter referred to as "groups") disposed opposite to the respective baffle surfaces and substantially medial thereof, the baffle surfaces being formed to retain particles extracted from the air flow.

The baffle surface may be formed of fabric material, e. g. having a pile or fluffy surface, in which the particles may become entangled or embedded in which case the surface may be cleaned by brushing or shaking outside the gas duct, or the surface may be oily in which case the surface can be removed and the oil filtered or otherwise cleaned, alternatively the baffle surface may be constituted by bristles, preferably of wire, arranged normally to the baffle.

The axes of the jets of the streams issuing from the apertured partition and the stiffness of the baffles are preferably such that the streams redirected from the baffles flow in paths lying in planes parallel to or substantially parallel to the baffles.

Each baffle may be renewable or movable manually for cleansing or renewal, and in constructions according to the invention employing a paste or gel or other fluid material as a baffle surface to which the dust particles stick and are thus retained, the sticky material may be applied to slides or trays removably fitted to the partition. Further, where a fabric material is employed this may be stretched over a slide or tray so as to be readily removable from the partition or a frame in which the baffles so constructed are mounted, the slide or tray giving the desired support to the baffle material. Alternatively each baffle may be comprised in a band of material movable across the front of a group of apertures in a plane perpendicular to the general direction of gas flow.

The band may pass over a roller to traverse the duct twice and an apertured partition may be associated with each traverse.

Alternatively each baffle may be comprised in an endless belt of material arranged in loops, whereby moving baffles are formed one behind the other and an apertured partition is arranged with regard to each loop so that successive filtering operations may be obtained.

Endless belts may be used with each apertured partition to provide different baffle surfaces for each partition and a partition may be arranged between the traverses or runs of the endless belt as well as outside so that both sides of the belt are used as filtering surfaces, and the two faces of the belt may present different filtering surfaces.

The baffles may be constituted by a belt of fabric, or webbing or the like, the roughness of the surface depending on the duty to be performed by the filter, and where a primary filtration has taken place to remove the heavier particles, baffles may be employed of cartridge paper or the like for the removal of soot, the baffles being supported against deformation on the impact of the air streams.

To this end plates may be disposed across the duct to support a belt against the impacts of the respective group of jets and the support may have marginal flanges to guide the belt.

Alternatively, the baffles may be incorporated in belts of leather or sheet metal, the surface of which is covered with an adhesive or oily substance, such as petroleum jelly or other gel, to which the particles would adhere. Alternatively the surface may be provided on the belts by a coating of paste such that the particles desired to be eliminated from the air or gas stream would be embedded and thereby arrested against further movement with the air stream. Such belts may be sufficiently rigid to resist deformation from the impact of the gas stream, but nevertheless such belts may be provided with supports.

It will be appreciated from the foregoing that the invention comprises a method of filtering in which the filtering may take place on a dry baffle or surface, or may take place on an oily or pasty surface.

In order that the invention may be more clearly understood several preferred embodiments as applied to an air filter intended to remove only such particles as soot and dust particles such as would be incorporated in ventilating or conditioning installations will now be described by way of example, with reference to the accompanying diagrammatic drawings.

In the drawings:

Figure 6 is a pictorial fragmentary view showing one form of a supporting plate for the baffle surfaces;

Figure 6a is a detail view of a modification; and

Figures 7, 8 and 9 are further views similar to Figures 3 to 5 illustrating other embodiments of the invention.

In the drawings like references designate the same or similar parts.

Figure 1:
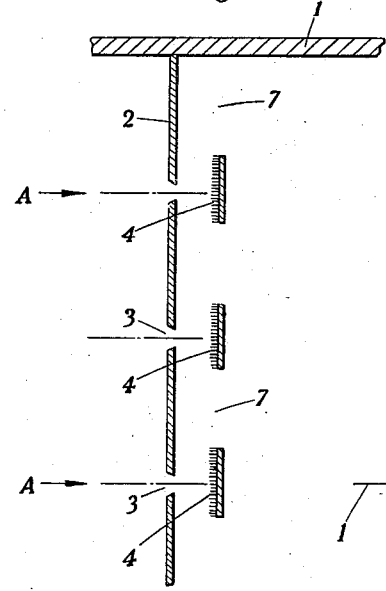
Figure 1 is a partial transverse section of a duct provided with an apertured partition providing groups of jets and spaced baffle surfaces arranged in front of the jets in the direction of gas flow.
Figure 2:
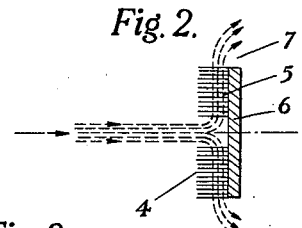
Figure 2 is a detail drawing indicating the path of the stream on striking a baffle surface.

Referring first to Figures 1 and 2, the duct 1, conducting the air to be filtered travelling in the direction of the arrows A, is provided with a transverse wall or partition 2 which has transversely spaced groups of apertures or nozzles 3, which may be either slots or flared openings to produce jets. The size or form of the openings will depend on the velocity desired to be obtained from the static pressure in the duct on the supply side of the partition 2. Parallel to this partition but spaced therefrom are arranged baffle surfaces 4 in close proximity to and opposite each of the spaced groups in accordance with the invention.

The baffle surfaces preferably comprise, as clearly shown in Figure 2, a base 5 and a surface 6 through which the air streams meander, the surface being formed of bristles which may be of wire and which provide individual filtering surfaces swept by the air and yet not obstructing the general flow of the air streams. The latter in wandering through the bristles attain a surface contact therewith and the latter eliminate and hold dust particles from the air streams.

The spacing of the bristles, that is the density per unit area, will depend on the nature of the dirt to be eliminated. The spacing will be greater for the collection of the larger dust particles and they will be more closely packed for the elimination of the finer particles. Each baffle is disposed sufficiently near the partition 2 to ensure that the streams emanating from the groups of jets opposite the baffles are wholly deflected by the base and distributed to move between the bristles to the space between the baffles, indicated at 7. The air then flows onwards along through the duct. The bristles need not cover the whole of the baffle surface though they are disposed so that the whole volume of the air stream is forced to pass between the bristles. For example, the middle area of the baffles, that is the area immediately opposite, the jets, where the streams impact upon the baffles need not be covered with bristles. There will be on impact a momentum change and the air streams will then be distributed through the bristles which surround the area of impact.

Dirt in the air stream will be eliminated by the base and by the bristles and filtering is thereby effected. Because there is a relatively small filtering surface, as compared with the total surface of the known type of filters hereinbefore referred to, the bristles are preferably formed on a continuously moving belt. The belt may be associated with a cleaning brush. By using a continuously moving belt and thereby disposing opposite the jets a persistently clean filtering surface, a constant elimination effect will be produced and in such a construction a constant resistance to air flow obtains, which resistance occurs solely at the jets and consequently a constant performance is obtained from such an installation.

Means may also be provided to wet the bristles so that dirt is eliminated rather by adherence to the bristles than by mechanical eradication from the air stream by eliminating momentum in the particles.

The baffles 4 may be comprised in a number of webs of material 6, each corresponding to the group of jets 3 opposite to them, and unrolled from one (e. g. an upper) roller 10 on to a lower roller 11 (see Figure 3) so that the baffle surface moves (e. g. downwardly) in the plane parallel to the partition in the duct. The width of each web 6 is such as to provide the spaces 7 between them to allow the air to move with minimum resistance between them, after the direction of the air stream from the nozzles in the partition has been changed to a direction of flow parallel to or substantially parallel to the surface of the baffles.

The web of material 6 may be in the form of webbing or may be material formed with a nap surface so that, although a maximum momentum change in the air stream is obtained yet the momentum in the particles of the air stream is eliminated, the particles finding small abutments or pockets which arrest the particles.

Figure 3:
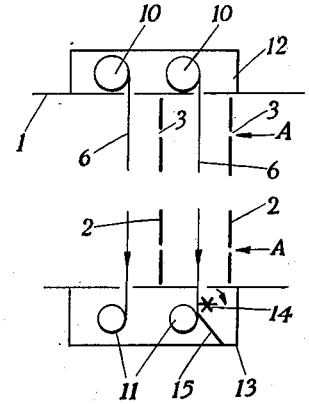
Figures 3, 4 and 5 show in elevation different arrangements of bands traversing a duct and carrying baffle surfaces according to the invention and related apertured partitions.

As shown in Figure 3, the top and bottom walls of the duct may have a casing 12 and 13 respectively, to receive the feeding and receiving rollers of the web material and the respective duct wall may be slotted to permit the passage of the web material. Such casings prevent air losses through the slots in the duct to the exterior thereof, and the lower one may act as a dust collector if a brush 14 is disposed near the web to remove the larger particles before they reach the receiving roller. Such brush revolves so as to sweep the bristles from root to tip.

The casing over the lower wall of the duct may itself be partitioned, as indicated at 15, so that particles falling from the baffle surface and passing through the slot, or other slots provided in the wall, to the partition 15 are collected so that they do not arrive at the receiving roller. The rollers can then be reversed when the roller 10 is empty.

Alternatively to obtain a web baffle surface movable across the duct in a horizontal direction, the sides thereof may be slotted adjacent to feeding and receiving rollers and means, such as wire brushes 14, provided within an external casing for removing collected particles from the web before it reaches the receiving roller.

By such arrangements a high efficiency is maintained throughout a filtering operation, the filtering surface will have a constant effect as regards the extraction of particles and the resistance to flow is always constant. The momentum of the air stream being filtered is determined by the jet speed, in other words the cross sectional area of the nozzles in the partition and the proximity of the baffle surface to the partition, while the spacing of the baffle surfaces transversely of the duct is determined in such a way as to provide a free passage for the filtered air forwardly through the duct.

It will be appreciated that in such constructions the width of the baffles will, therefore, have a predetermined relation to the lateral spacing between them and the width may be substantially equal to half the pitch of the apertures, the baffles being disposed so that all air passing through the partition is directed to the middle area of a baffle surface and is filtered without unduly affecting the pressure of the air passing through the duct.

After the receiving roller 11 has received the web material from the feeding roller 10, the receiving roller may be removed and the feeding roller 10 put in its place to permit further operation with a new web material provided on a new feeding roller. After use the filtering material may be cleaned and be available for re-use with a minimum interference with the normal working of the installation.

Apparatus according to the invention may include two sets of moving filtering webs as illustrated in Figure 3, constituting the baffle surfaces and two apertured plates, the first of the webs in the direction of air flow may be dry and be employed to remove the heavier particles and the second of the webs may carry a sticky or pasty substance so as to collect the finer particles.

Figure 4:
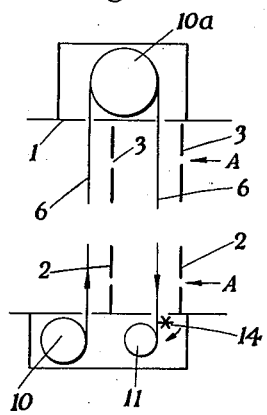

Instead of using two sets of web material to provide the two sets of baffle surfaces, a single roller 10a (as shown in Figure 4) may be provided over which a loop of web material is taken from the feeding roller 10 to the receiving roller 11, there being thus provided in front of each group of apertures 3 in the two partitions 2, a length of web material 6 which is taken off one roller and fed to a second roller. A brush 14 may be employed to remove the larger particles collected by the filtering surfaces 6.

Figure 5:
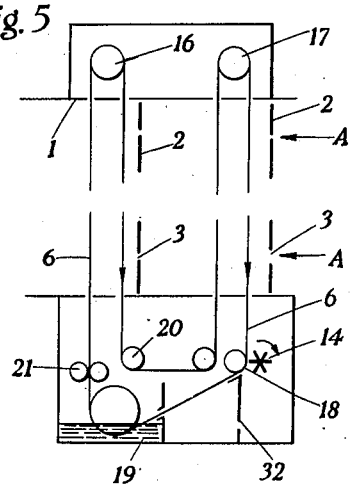

In such an arrangement both sides of the web material are employed, the outside of the loop being the first duty surface and may be the dry surface, the inside of the loop having the wet, tacky or sticky surface to which light dust will adhere.

Where it is desired to employ a definitely wet filtering surface, e. g. one in which an oily substance is applied to the baffle surface, each baffle surface may be in the form of an endless belt providing two loops, as shown in Figure 5, the arrangement being such that the general form of the belt arrangement represents the letter U. Such an arrangement will be used with two partitions 2 in a duct so as to provide two filtering operations on the air stream, and includes a run of the belt 6 across the front of each partition 2, the two loops depending from two suitably spaced rollers 16 and 17. From the upper roller 17 the belt 6 passes under a roller 18 which keeps the baffle surface parallel to the partition, thence into an oil bath 19 and under another roller therein from which it passes back to the upper roller 16, the run of the belt leaving this roller provides the left hand moving filtering surface and passes under suitably disposed rollers 20 so that from thence it passes back to the upper roller 17.

In this arrangement there may be provided a doctor or wiper, as indicated at 21, for removing excess oil from the belt material and the roller 18 may be associated with a brush indicated at 14, so as to remove the particles thereon into a collector, indicated at 32. The brush 14 is preferably a rotary member moving at a relatively great speed so that the oil bath does not become clogged by receiving the heavier particles removed from the gas stream at the first partition.

Though mention is made of upper rollers 16 and 17 this is only by way of example as the belt may be carried over rollers having vertical axes, instead of horizontal axes, in order to provide baffles across the front of the apertured plates, and in such case an oil bath would not be employed, but sprays would be included to provide the wet surface, and a vacuum slot means or a brush might be provided to cleanse the belt material and to remove the extracted dust particles to the outside of the duct, before the material reaches the sprays after functioning as a filter.

It will be appreciated that there will be as many webs or belts as there are groups of apertures on the partition, but each roller 10 may be operative on each of the webs or belts, or as indicated in Figure 6 rollers 10, individual to each web or belt, may be simultaneously driven from a shaft 22 driven from pulley 23. To retain the required rigidity in the several webs or belts 6, the latter may move in front of supports 25 which prevent deformation of the webs or belts under the combined pressure of the groups of jets; for example, spaced plates 26, see Figure 6, including supports 25 may connect the opposite walls of the duct and each support 25 may be provided with peripheral channels 27 through which the belt or web material 6 is guided.

Instead of using an endless belt of which the material is arranged to represent the letter U, as already described with reference to Figure 5, two endless belts 6 may be used as shown in Figure 7, which are individual to each partition 2 and one set of belts 6 may be provided with means, such as a brush 14, for removing larger dust particles and means, such as a doctor 21, may be provided for removing excess oil from the other set of belts as the material leaves the oil bath through which the belts pass at the lowest part of their journey. In such arrangement a suction nozzle 28 may be employed to remove smaller dust particles eliminated at the first stage, the very light particles being collected at the second filtering stage.

One endless belt may also be employed with two partitions, as shown in Figure 8, so that one length of belt presents the outer surface of the belt to the first partition 2 considering the general direction of air flow in the duct, and the other length of material presents the inner surface of the web to the second partition 2, which is inside the endless belt.

Although in the description here given of preferred embodiments, reference has been made to the employment of a plurality of belts or rolls of material to provide the baffle surfaces, where more than one filtering stage is required it will be clear that the material need not be the same at each filtering stage, but the surface of the filtering medium, that is to say, the unevenness of the surface will depend on the duty to be performed, a rougher material will provide a first duty material and similarly in later stages of filtration there may be, instead of an adhesive surface, a soft surface which is dry and made soft by merely wetting with water, and it should be understood that where reference has here been made to a web or belt being provided with a surface to which dust particles adhere, the surface need not be such that adhesion is more than of very temporary nature, that is sufficient to extract the particles from the air stream, particularly where brushes or other scratching devices are employed to remove the dust particles into a receptacle and therefore substantially to clean the surface for further use.

In Figure 9 is shown an installation for filtering air in which the filtering material is in the form of a belt of a rough matt paper, e. g. Whatman. The paper is fed from feed roll 10 downwardly in front of the first partition 2, considering the direction of air movement, and after passing under spacing rollers 30 the web traverses the duct in front of the second partitions by passing over guide roller 31. The filtering effected in front of the first two partitions will be produced by the air streams impinging on the dry material and the heavier particles will be eliminated by being trapped by the pits on the paper surface. Brushes 14 are preferably employed after each stage to remove the dust collected, and a collector 32 is provided to keep the dust from the belt, as it runs to the guide roller 33. In passing to the upper roller 34 which gives a path for the paper parallel to the next partition 2, the back of the paper may be wetted by a blanket roller 36 revolving in a water bath so that the front of the paper is damp and is conditioned to remove light particles whilst the wetted surface passes over roller 35 to the receiving roller 37 and is presented to the partition 2 at the last stage.

Where several partitions and corresponding baffle surfaces are employed the apertures in the respective partitions may be of decreasing cross sectional area in the general direction of flow of the air stream. Such an arrangement may be employed in a multi-stage filter, as shown in Figure 9 at $3^a$, $3^b$ and $3^c$, to assure a speed for the air issuing from the later groups of jets, which will cause the air to reach and sweep the baffles to eliminate the lighter and smaller particles of dirt after the bulk of the impurities, usually heavier and larger, had been eliminated in the early stages. The actual pressure drop across the whole filter can be distributed in any convenient way to obtain this result and the summation of the pressure drops constitutes the total resistance of the filter to air flow.

In all the constructions referred to the air stream issuing from the jets of every group will be directed substantially normally to the baffle surface and a maximum momentum change obtained. There will be constant renewal of the cleaning surfaces so that a constant and high efficiency is obtained. Further, there is a minimum resistance to air flow, but as the air does not have to pass through the filtering surfaces, a constant resistance in the system obtains. It will be appreciated, therefore, that the streams of air, on leaving the partitions 2, move at a high speed in order to reach the respective baffle surfaces and to have sufficient velocity to maintain the ventilating volume in the duct. By merely adjusting the speed of the fan supplying the duct, the desired jet speed can be obtained, the cross sectional area of the jets and their distance from the baffle surfaces already providing an approximation to the required adjustment of air speed within the duct.

The invention includes the provision and use of filtering surfaces of curved or cupped form as at 39, Fig. 6a, so that instead of changing the direction of flow by constraining the air after leaving the surface to take a path substantially at right angles to the original direction of flow, the change produced by the curved surface may be such that the air flow is generally reversed. In both circumstances there is a maximum change of momentum. Curved supports may be formed from a support plate 26 by slitting the ends of the support 25 shown in Figure 6, and bending up the freed edges, as indicated by the chain lines 39.

Although in the constructions described reference has been made to the employment of a brush, such as indicated at 14, for removing dust particles collected by the baffle surfaces, this is by way of example only, as the surfaces, particularly where are formed of bristle, for instance of wire, may be cleaned by jets or by immersion in a suitable fluid, and may then be sprayed with oil to prepare the bristles for a second elimination effect where the dust from the gas stream treated is to be removed by contact with a wetted surface.

Further, when continuously moving belts are employed the relatively small filtering surface may be constituted by metal wool, glass wool or of pads of fibrous material, and such surface may be wetted by including a bath in the path of the belt or by spraying, and may be cleaned by applying jets of the wetting liquid to the surface before it reaches the bath, further the base or belt carrying the baffle surface may be of a gauze material of fine mesh. Moreover, although the bristles herein referred to are visualized as being perpendicular to the base, they may be inclined thereto.

Moreover, in referring to continuously moving belts a construction is contemplated wherein the speed is sufficiently rapid that the operative baffle surface is never exposed for such a time to the air streams that its filtering capacity is reduced by becoming loaded with dirt, as might occur if there was an intermittent movement of the belt system which, considered on the basis of say 24 hours operation, would have a speed of few feet per day. The continuously moving system according to the present invention operates at a relatively rapid speed of few feet per hour; there is a constantly operative surface always exposed and the filtering effect is not interrupted for the purpose of removing the filtering surface from the duct for cleaning purposes.

By the present invention a perfect control of the flow of the air to be filtered is obtained and accordingly at all times the whole of the air volume passes across the filtering surfaces and the speed at which the surface moves is predetermined in relation to the speed of the air streams emanating from the apertured partition, so that the whole of the air stream obtains a surface engagement with a filtering surface having a constant degree of cleanliness, whereby a constant filtering effect obtains and the resistance to flow is substantially wholly incurred at the jets.

I claim:

1. A filtering duct, a plurality of apertured partitions mounted transverse the duct, the apertures in the partitions providing jets to form rows of high speed streams of gas to be treated, and a baffle formation including a plurality of baffle members arranged in rear of each partition in the direction of gas flow, said baffle members comprising filtering surfaces provided to retain particles extracted from the gas flow, the filtering surfaces of successive baffle formations serving to retain particles of increasing fineness respectively, the apertures in the successive partitions in the direction of gas flow being of relatively increased restriction.

2. Apparatus according to claim 1, wherein each baffle member is made up of a continually moving web on which filtering surfaces are formed.

3. Apparatus as claimed in claim 1 wherein the apertures in the partitions are arranged in alignment, said baffles being successively constructed to remove from the gas stream particles which are progressively finer, each of said baffle members being formed by continually moving webs on which filtering surfaces are formed.

4. Apparatus as claimed in claim 1 wherein the baffles are wetted to remove from the gas stream particles which are progressively finer, means for removing and collecting dust from the continuously moving baffle members.

5. A construction as defined in claim 1, wherein the baffle members are spaced apart in a direction transverse the gas stream to provide relatively small filtering surfaces and eliminate undue pressure build-up in the gas stream.

CHRISTOPHER LAWRENCE SAINTY.